United States Patent

Gollan

[15] 3,674,684
[45] July 4, 1972

[54] CONTINUOUS FLUID-SOLID CONTACT METHOD AND APPARATUS

[72] Inventor: Ayre Gollan, Silver Spring, Md.
[73] Assignee: Hydronautics Incorporated, Laurel, Md.
[22] Filed: July 13, 1970
[21] Appl. No.: 54,226

[52] U.S. Cl. ............................210/33, 210/40, 210/80, 210/189, 210/269
[51] Int. Cl. .............................B01d 15/06, B01d 33/18
[58] Field of Search ........210/20, 33, 78, 189, 268, DIG. 21, 210/40, 23, 80, 81, 269

[56] References Cited

UNITED STATES PATENTS

| | | | |
|---|---|---|---|
| 3,424,674 | 1/1969 | Webber | 210/20 |
| 3,215,623 | 11/1965 | Hix | 210/24 |
| 2,863,829 | 12/1958 | Henke et al. | 210/78 X |
| 3,494,862 | 2/1970 | Horowitz | 210/40 |
| 3,400,549 | 9/1968 | Karnofsky | 62/58 |
| 1,620,431 | 3/1927 | Bramwell | 210/189 |
| 3,049,888 | 8/1962 | Bosworth | 62/58 |
| 3,070,969 | 1/1963 | Ashley et al. | 62/58 |

*Primary Examiner*—Reuben Friedman
*Assistant Examiner*—Thomas G. Wyse
*Attorney*—Finnegan, Henderson, Farabow & Garrett

[57] ABSTRACT

A method and apparatus for removing a first component from a fluid stream comprises contacting the fluid stream with a continuously moving bed of filter material, contained within a separation column, recovering the contaminated filter material, and regenerating it for reuse. The continuously moving bed of filter material is moved through a contact zone in the separation column by creating a hydraulic force on the material from the flow of a carrier liquid through the material. The fluid stream can be an oil-water mixture from which oil is removed by an absorbent filter material.

28 Claims, 4 Drawing Figures

INVENTOR
ARYE GOLLAN

Finnegan, Henderson & Farabow
ATTORNEYS

INVENTOR
ARYE GOLLAN

*Finnegan, Henderson & Farabow*
ATTORNEYS

CONTINUOUS FLUID-SOLID CONTACT METHOD AND APPARATUS

This invention relates to a method and apparatus for continuously contacting a solid with a fluid. More particularly, this invention relates to a method and apparatus for continuously contacting a liquid stream with a moving body of solid particulate material.

In the past, various methods have been used for contacting fluid streams with solid material for effecting such transport phenomena as filtration, adsorption, absorption, ion exchange, heat transfer, catalysis, and the like. In each of these processes it is usually necessary to replenish the solid particulate material when the desired activity between the solid material and fluid stream decreases to a point where the efficiency of the process is substantially decreased.

In the past, the contact of the fluid stream with the solid material and the replenishing of the solid material have been accomplished by various methods. In one method, a stationary bed of the solid material is contacted with the fluid stream. When it is desired to replenish the solid material the flow of fluid is terminated so that the solid material can be removed and replaced with fresh material.

In a second method of contacting solid material with a fluid stream, the contact is effected with a moving mass of solid material. The use of a moving mass of solid material has various advantages over the use of a fixed bed of solid material. These advantages include flexibility, ease of regeneration of the spent solid material, uniformity of operation, continuity of operation and the like. Previously, solid material has been moved through a contact zone while it is maintained in a so-called fluidized state where there is mixing of the solid particles. Solid material has also been moved through a contact zone without fluidization by such means as the use of gravity and bucket elevators, screw conveyor feed means, ans oscillating cylinder-piston valve assemblies. These methods, however, require complex equipment.

The provision of a solid-fluid contact operation which would efficiently and intimately contact the fluid with the solid would be particularly desirable in the separation of liquid-liquid mixtures wherein a first liquid is immiscibly mixed with a second liquid and in particular would find great application in the cleaning of oil in water suspensions.

For example, pollution of the seas, lakes and rivers by ships or watercraft that discharge oily ballast and bilge water has become a serious problem as a result of a substantial increase in the petroleum cargo volume. Although there are many public laws which prohibit the discharging of oily waters into harbors, coastal waters or inland waterways, and which set high penalties for violators, many ships often discharge such water in order to avoid violation of safety regulations concerning the amount of ballast water needed to meet with stability requirements at sea.

Oily ballast water can contain various kinds of oil residuals, such as, for example, low viscosity light oils having a specific gravity range of 0.8 to 0.9, high viscosity fuel oil like Bunker "C" oil having a specific gravity of 0.95 to 1.1, or a mixture of different oils. An appreciable amount of oily ballast water is contaminated with Bunker "C" oil normally found in a suspension form in water. Its separation is considered to be more difficult than other oil-water suspensions. Therefore, any multipurpose liquid-solid contact operation for separating oily water suspensions should be capable of effectively separating Bunker "C" oil from oil-water mixtures.

Although there have been a number of prior developmental efforts on the problem of oil-water separation, and in particular on the separation of Bunker "C" oil from water, a practical working solution to the problem has not yet been developed. Prior developmental efforts have not produced, on a long run basis, an effluent consistent with waste water discharge criteria as specified by the public laws. An oily mixture is usually defined by these laws as a mixture containing 100 parts per million oil or more. Typical oily ballast water contains on the average 1,100 parts per million oil.

In the past, gravity separators which utilize the difference in specific gravity or density of materials to effect separation have been used to separate light oil-water mixtures. These separators, however, require too much space. Moreover, since there is a very slight or in some instances no specific gravity difference between Bunker "C" oil and water, gravity separators cannot be considered as a practical device for Bunker "C" oil-water spearation. For this and other reasons arising from the stickiness and high viscosity of Bunker "C" as well as from the high investment cost, gravity separators, such as centrifuges, do not offer a practical solution to the problem of separating oil-water suspensions.

Coalescing materials, such as knitted wire mesh, and Dutch weaves, have also been tried and have proved successful to a limited extent. Major operational and control problems, however, have been encountered with the use of coalescing material and these problems preclude the use of coalescing materials on a wide scale. The problems encountered with coalescing materials include clogging of the coalescing materials by the viscous, sticky Bunker "C" oil, sensitivity of the coalescing material to dirty ballast water, inability of the coalesing material to accommodate high momentary increases in oil content and difficulties in collecting the different specific gravity Bunker "C" oils.

Filters, such as steel wool, fiberglass, and the like have also proved successful in separating either light or heavy oil-water mixtures by retaining the contaminants. Wide scale utilization of filters is, however, not practical because rapid pressure build-up in the filters requires frequent regeneration of the filters.

Pebble beds have also been used with oil that is lighter than water to separate the oil from the water. Although their function as oil separators has proved to be successful, however, due to frequent bed upsets encountered in operation and in bed cleaning, its use has been abandoned.

Therefore, a primary object of this invention is to provide a process and apparatus for contacting a fluid stream with a solid particulate material in an efficient and intimate manner so that a desired interaction between the solid and fluid material can take place.

A further object of this invention is to provide a process and apparatus for efficiently separating a first liquid component from a fluid stream in a continuous and efficient manner.

A still further object of this invention is to provide a process and apparatus for separating oil-water mixtures containing ballast water so that the ballast water can meet the requirements of waste water discharge laws.

Additional objects and advantages of the invention will be set forth in part in the description which follows and in part will be obvious from the description or may be learned from practice of the invention. The objects and advantages are realized and attained by means of the instrumentalities, processes, methods and combinations particularly pointed out in the appended claims.

To achieve the foregoing objects and in accordance with its purposes, the method of this invention for separating a first component from a fluid stream, as embodied and broadly described, comprises continuously moving solid filter material through an elongated separation column having a particle inlet end and a particle exit end by flowing a stream of carrier liquid through the filter material in a first direction and withdrawing the carrier liquid from the filter material at a point intermediate to the ends of the column to provide a hydraulic force which consolidates the filter material and moves the material through the column in the first direction from the inlet end toward the exit end, introducing a fluid stream into the column and contacting the stream with the solid filter material to remove a first component of the stream, and separately removing the filter material containing the first component of the fluid stream and the fluid stream from the column.

Preferably, the fluid stream is contacted with the solid filter material at a point intermediate the particle inlet and exit ends of the column. The removed filter material, desirably, is regenerated by separating the first component from the filter material. It is also preferred that the first component be a liquid and be separated by heating the removed filter material to increase the fluidity of the liquid. Alternately, the liquid first component can be separated by contacting the filter material with a solvent for the liquid. It is further preferred to apply centrifugal force to the filter material to aid in removing the liquid first component from the filter material. The fluid stream is desirably an oil-water, liquid-liquid mixture, and the filter material is an absorbent material for removing the oil from the stream.

In another aspect of this invention, an apparatus is provided for continuously removing a first component from a fluid stream which, as embodied and broadly described, comprises an elongated separation column having a particle inlet end for admitting solid filter material and a particle exit end for removing solid filter material, solid filter material positioned within the separation column between the ends, an inlet opening for introducing a fluid stream into the separation column and contacting the fluid stream with the solid filter material, drive means to flow a carrier liquid to the separation column through the filter material under pressure to continuously move the filter material by hydraulic force through the column in a first direction from the particle inlet end toward the particle exit end, and an outlet opening intermediate the particle inlet and exit ends for removing an exiting fluid from the filter material.

It is to be understood that both the foregoing general description and the following detailed description are exemplary and explanatory but are not restrictive of the invention.

The accompanying drawings illustrate an example of a preferred embodiment of the invention, and together with the description serve to explain the principles of the invention.

In accordance with this invention, solid filter material for selectively removing a first component from a fluid stream is continuously moved through an elongated separation column having a particle inlet end and a particle exit end by flowing a stream of carrier liquid through the filter material in a first direction and withdrawing the carrier liquid from the filter material at a point intermediate to the ends of the column to provide a hydraulic force which consolidates the filter material and moves the material through the column in the first direction from the particle inlet end toward the particle exit end.

The filter material used in the present invention is particulate in form and is selected to be specific to the component that is desired to be removed from the fluid stream and, depending on the fluid stream involved, can function by absorption, adsorption, agglomeration, ionic exchange, physically trapping the material to be removed and the like. The filter material used is usually specific to only one of the components in the fluid stream, but in appropriate circumstances can be selected to be specific to more than one component in the fluid stream. Also, the filter material itself can be comprised of two or more components. The removal of the first component from the fluid stream can be either for the purpose of treating the stream to remove an undesired component from the stream or for the purpose of treating the filter material by contacting it with a component contained within the stream.

When the fluid stream to be treated is an oil-water mixture, the filter material is preferably a solid absorbent material for removing the oil from the oil-water mixture to clarify the water in the mixture. Suitable filtering material for oil-water mixtures include porous, easily compressible material, such as polyurethane foam or felt stock; ceramic or metallic material; polystyrene foam beads; pellets of polyethylene, and the like. The specific composition of the individual filter particles is dictated, in part, by the desired post filtration technique that is to be used in the process after the oil is removed from the water. Examples of suitable post filtration steps are discussed below.

Figure 1:
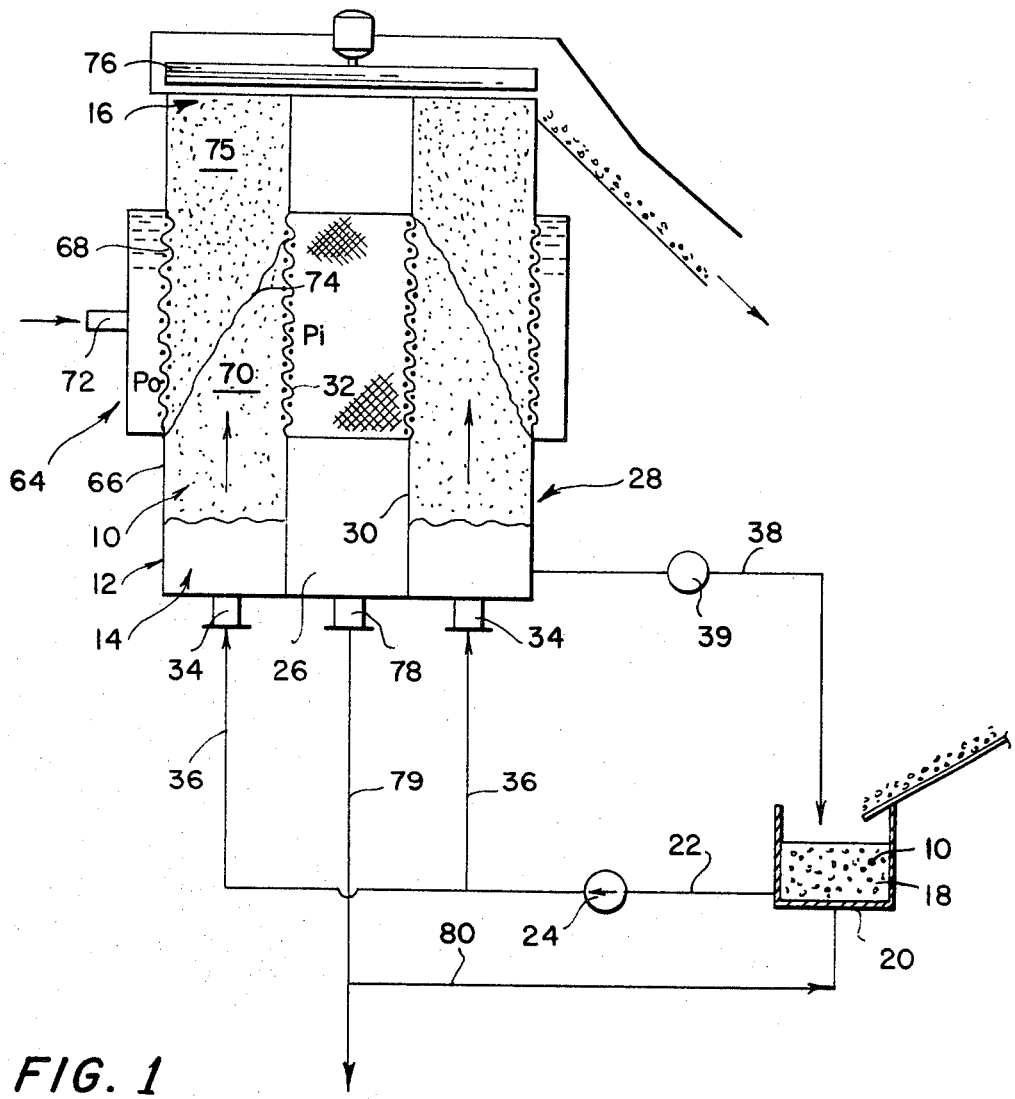
FIG. 1 is a schematic flow diagram showing the continuous moving of a filter bed for separating oil-water mixtures in accordance with the teachings of this invention.

As here embodied, and as shown in FIG. 1, the solid filter material is a solid absorbent material, generally 10, and is moved upwardly through a vertical cylindrical separation column, generally 12, by the creation of a hydraulic force which consolidates absorbent material 10 and forces it upwardly through the separation column. Absorbent material 10 is introduced into the separation column at a particle inlet end, generally 14, at the bottom of the column. A particle exit end, generally 16, is at the top of column 12. Absorbent material 10 is mixed with a carrier liquid 18 in an open tank 20 to form a slurry, and this slurry is withdrawn from the tank through a slurry line 22 by a slurry pump 24 which continuously forces carrier liquid 18 containing solid absorbent material 10 into particle inlet end 14 of separation column 12.

When the fluid stream to be treated is an oil-water liquid-liquid mixture, the carrier liquid is preferably fresh or already treated water. Any carrier liquid which will not contaminate the filter material or otherwise interfere with the separation can be used.

Separation column 12 has a cylindrical core 26 and an outer annular shell 28 which surrounds the core. Core 26 is separated from annular shell 28 by a cylindrical core wall 30 which extends the length of column 12. Core wall 30 has a central retaining screen 32 which provides communication between shell 28 and core 26 and serves as an outlet opening for removing fluid from absorbent filter material 10 while preventing absorbent material 10 from entering core 26.

Particle inlet end 14 of column 12 is located at the bottom end of shell 28 and is provided with two inlets 34 approximately 180° apart which are connected to slurry line 22 by slurry inlet lines 36. Slurry pump 24 acts as a drive means to force carrier liquid 18 and solid absorbent 10 through slurry line 22 into slurry inlet lines 36 and into the bottom of annular shell 28 of column 12. Although the particle inlet end of the separation column is here illustrated as being physically located at the bottom of the column, it can be located elsewhere.

A consolidated mass of absorbent material 10 is initially formed in separation column 12 during start-up by conventional means such as by initially packing the column with absorbent material 10. Hydraulic force to move the consolidated absorbent material 10 through column 12 is produced by allowing a controlled portion of the incoming carrier liquid 18 to flow through the lower section of the consolidated absorbent material 10 and to be withdrawn through retaining screen 32, which serves as an outlet for the carrier liquid.

The carrier liquid being withdrawn must, however, flow at least partially in the same direction as the desired movement of solid absorbent material 10 through the separation column to insure that the absorbent material will move in the desired direction. The pressure at particle inlet end 14 of column 12 created by that potion of carrier liquid that flows through the lower section of the bed tends to consolidate the fresh solid absorbent material 10 of the slurry into a filter mass or matrix having a desired permeability. The pressure at particle inlet end 14 further causes the consolidated mass of solid absorbent material 10 to move in a predetermined upwardly direction from particle inlet end 14 toward particle exit end 16. Since additional solid absorbent material is continuously being added at the bottom of column 12 and carrier liquid is continuously being removed from the column, the force acting on a consolidated mass of absorbent material 10 at particle inlet end 14 of the column forces solid absorbent material 10 up through the column where it is eventually discharged.

Although as previously indicated a wide range of filter material can be used, there is one characteristic of the filter material in addition to its selectivity which aids in determining the particular material to be used. The filter material should be able to form a filter matrix or bed of such rigidity that the porosity of the bed is maintained under loading and flow conditions, that is, the characteristics of the bed should be such that it is not subject to either blank off or collapse when the pressure of the bed becomes excessive. This criterion encourages the utilization of filter material of discrete roundish particles to produce a filter bed with a controlled void fraction that is available for flow. The filter material, thus, is preferably in a configuration of pellets, pebbles, spheres, and the like.

As will be apparent to those of ordinary skill in the art, the exact amount of hydraulic force and, therefore, the rate of movement of the filter bed through the separation column obtainable by practice of the present invention can be varied and is dependent on such factors as the pressure applied to the slurry, the discharge pressure of the carrier liquid, the distance between the slurry intake and carrier liquid discharge, the flow rates of the carrier liquid and solid absorbent, and the like. These variables are all interrelated and can be chosen to obtain any desired hydraulic force, and therefore, rate of movement of the bed through the separation column.

In accordance with a preferred embodiment of moving filter material through a separation column by hydraulic force, means are provided to vary the hydraulic force obtainable in the separation column. As here embodied, and as illustrated in FIG. 1 this means comprises a carrier liquid control line 38 for varying the flow rate of the carrier liquid through the bed of consolidated absorbent material 10. The amount and flow rate of carrier liquid needed to introduce a desired quantity of absorbent material into the separation column often differs from the amount and flow rate of carrier liquid needed to produce a desired hydraulic force. The provision of a carrier liquid control line permits a controlled portion of the incoming carrier liquid to flow through the consolidated absorbent bed to create a desired hydraulic force and further permits the use of the amount and flow rate of carrier liquid that is needed to introduce the desired quantity of absorbent material into the separation column.

Carrier control line 38 connects particle inlet end 14 with slurry tank 20 and permits carrier liquid 18 to be continuously withdrawn from inlet end 14 into slurry tank 20 where fresh slurry is continuously formed. A variable control valve 39 is positioned in control line 38 to control the rate of flow of carrier liquid through the control line from inlet end 14 to slurry tank 20. As the rate of flow of carrier liquid through control line 38 is varied, the flow rate of slurry entering the separation column is inversely varied which results in the varying of the inlet pressure and therefore in the hydraulic force obtained in the separation column. The hydraulic force or the velocity of the filter bed can thus be controlled and this aspect is particularly important in treating oil-water mixtures. By controlling the velocity of the filter bed, the separation column can be made responsive to surges in oil content of the oil-water mixture. As the oil content increases, the velocity of the filter material can thus be increased to accommodate the increased oil content.

In accordance with the invention, a fluid stream is introduced into the column and contacted with the solid filter material to remove a first component from the stream.

The fluid stream being treated is a stream containing at least two different components which can be separated by a filter medium. The fluid stream has one component which is a fluid, such as a gas or liquid, and at least one other component which can be a gas, liquid, or a solid. The component removed from the fluid stream by the filtering medium can be either in gaseous, liquid, or solid form. Moreover, the present invention contemplates that the fluid stream can contain ions and that the removal of the first component can be a removal of ions from the stream along with the simultaneous exchange of ions contained within the filter material as in conventional ion-exchange methods.

As here embodied, the fluid stream is a liquid-liquid mixture, and more particularly is an oil-water mixture, such as, for example oily ballast water from a ship containing an average of 1,100 parts per million oil in water. The oil in the oily ballast water can be a low viscosity light oil having a specific gravity range of 0.8 to 0.9, a high viscosity fuel oil such as Bunker "C" oil having a specific gravity of 0.95 to 1.1, or a mixture of different oils.

As shown in FIG. 1, the oily ballast water mixture is introduced into separation column 12 at a point intermediate the particle inlet end 14 and particle exit end 16 through an annular intake jacket generally 64 which encloses the outer middle portion of annular shell 28, intermediate particle inlet end 14 and particle exit end 16 of the column. Jacket 64 communicates with the interior of shell 28 through a retaining screen 68 on the outside wall 66 of the shell. Retaining screen 68 of outside wall 66 is aligned with retaining screen 32 of core wall 30 to define a contact zone 70 between the two screens where the oily ballast water contacts solid absorbent 10.

The oily ballast water enters intake jacket 64 through an inlet 72 under a pressure $P_o$ which forces the ballast water transversely across column 12. Upon entering jacket 64 the oily ballast water flows through retaining screen 68 of outside wall 66 into annular shell 28 where it comes into contact with the upwardly moving consolidated mass of solid absorbent 10. As the oily ballast water contacts solid absorbent 10, the oil in the mixture is selectively absorbed into and/or adhered to the absorbent material and removed from the water in the mixture.

As seen in FIG. 1, the solid absorbent upwardly moving bed is being loaded by the oil droplets in contact zone 70. The solid absorbent at the upper end of contact zone 70 thus contains more oil than the entering solid absorbent at the bottom of the contact zone, and this oil decreases the local permeability of the absorbent and flow of ballast water through the zone. As the column of solid absorbent moves upwardly through the zone, the solid absorbent nearer retaining screen 68 of outside wall 66 loses its ability to absorb oil from the ballast water so that the oily ballast water must penetrate further across the width of the contact zone before the oil is separated from the water. This is reflected in FIG. 1 by the formation of a zone line 74 which indicates the distance the incoming ballast water travels before the oil is removed. As the solid absorbent leaves contact zone 70 and moves toward particle exit end 16, the absorbent is no longer contacted with the entering oil-water mixture, and enters a drainage section 75 where water that has remained on the absorbent material is drained therefrom.

The pressure $P_o$ of the oily ballast water entering the contact zone is sufficiently greater than the pressure $P_i$ at core retaining screen 32 so that a high rate of lateral fluid flow exists between the shell retaining screen and the core retaining screen enabling a large volume of oily ballast water to be treated in a short time.

Ballast water containing oil residues can be either in a stable emulsion form where the oil is in the form of small droplets that are tightly bound in continuous water phase, or in suspension form where the oil droplets are larger and can be more easily separated from the water.

Ballast water-low viscosity light oil mixtures are frequently found in a stable emulsion form. The removal of oil from such emulsions or the "breaking" of such emulsions is preferably accomplished with the assistance of de-emulsifiers. The preferred de-emulsifiers are usually chemicals which can be added to the emulsion at any point before the emulsion enters the contact zone or can be added directly to the contact zone. Also, fibrous material, such as, for example, cotton fibers or Dynel fibers can be inter-dispersed with the particulate filter material to abet the breaking of oil in water emulsions.

On the other hand, high viscosity oil-water mixtures such as, for example, Bunker "C" oil-water mixtures generally remain as a suspension and do not form an emulsion. Therefore, when treating Bunker "C" oil-water mixtures, it is not necessary to "break" an emulsion by using a de-emulsifier to aid in the removal of Bunker "C" oil from ballast water.

Although the fluid stream is here illustrated as flowing transversely across the solid absorbent, if desired, the separation column can be designed to effect countercurrent flow of the fluid stream through the absorbent.

In accordance with the invention, the filter material containing the first component of the fluid stream and the fluid stream are separately removed from the column. As here embodied, and as shown in FIG. 1, the absorbent material is removed from particle exit end 16 at the top of separation column 12 by a rotating scraper 76, which breaks the moving mass of absorbent material into small particles and sends it to a post filtration operation.

The clean ballast water, which is under a transverse pressure, flows through the solid absorbent and passes through core retaining screen 32 where it enters core 26 and combines with carrier liquid 18 that is also flowing through core retaining screen 32 and into core 26 to form an exiting fluid flow. The ballast water and carrier liquid thereafter flow together downward through core 26 by gravity and exit the column at discharge opening 78 and enter discharge line 79. As seen in FIG. 1, a portion of this ballast water and carrier liquid fluid flow may be recycled through a recycle line 80 to slurry tank 20 to comprise a portion of the carrier liquid. The amount of water from this ballast water and carrier liquid fluid flow that is recycled is desirably equal to the amount of carrier liquid that is permitted to flow through the lower section of the consolidated absorbent material to create the hydraulic force.

The present invention is designed to operate on a continuous basis, and to achieve a continuous method of operation the contaminated filter material must be continuously removed from the separation column and after removal disposed of or recycled. The recycling treatment or ultimate disposition of the filter material that is used depends on such factors as the characteristics of the filter material used, the nature of the component removed from the fluid stream, and the physical facilities available for treating the filter material.

Figure 2:
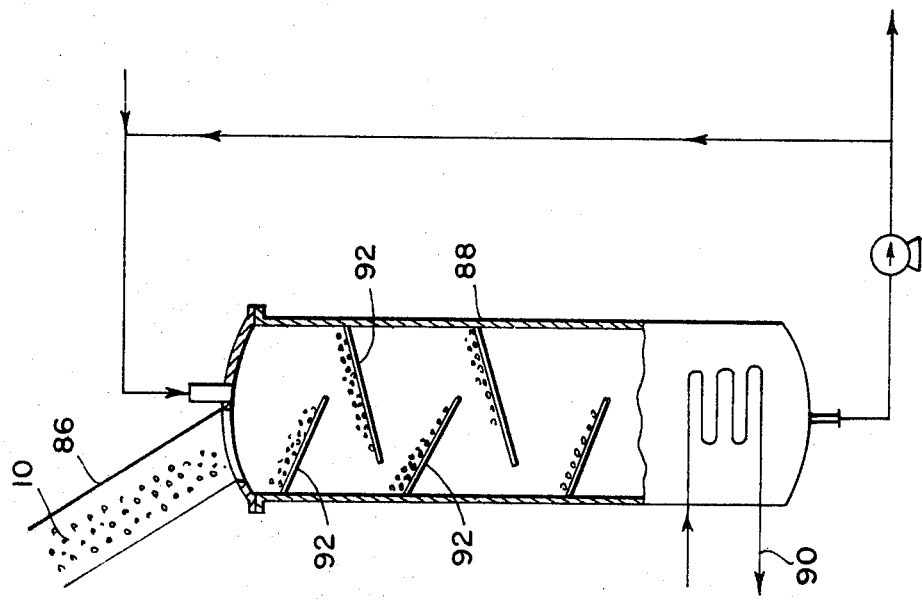
FIG. 2 is a schematic flow diagram showing one embodiment of a method for disposing of spent filter material.

In accordance with one embodiment of a post filtration operation the filter material is low in cost, expendable, and is to be passed through the separation column only once. After removal from the separation column, the filter material is disposed of by a conventional means such as burning. As here embodied, the filter material is an expendable absorbent material, such as, for example, polystyrene foam beads, and after removal from separation column 12 is dissolved in hot oil and burned. As illustrated in FIG. 2, the oil bearing polystyrene foam beads from the top of the separation column are directed by a chute 86 to a contact column 88 by gravity. The contact column has an inlet at its top for admitting a hot oil which can dissolve the beads. Bunker "C" oil is effective for dissolving polystyrene foam beads and is admitted at the top of the column. A steam piping system 90 at the bottom of contact column 88 heats the contact column.

In operation, as the oil bearing beads enter the top of contact column 88 they fall by gravity onto a series of inclined shelves 92 which extend throughout the length of the column. Simultaneously with the entering of the beads into the column, hot Bunker "C" oil is admitted through the top inlet to contact the oil bearing beads and dissolve them in the Bunker "C" oil. As the beads travel downwardly through the column they are dissolved in the Bunker "C" oil so that the bottom of the column contains a solution of Bunker "C" oil and bead material. The Bunker "C" oil and bead material are drawn from the bottom of the column and passed to burners where the Bunker "C" and bead material are burned. As seen in FIG. 2, a portion of the hot Bunker "C" oil coming from the bottom of the column may be drawn off and recycled to the top of the column for dissolving the oil bearing beads as they enter the top of the column. Further, Bunker "C" make-up oil can be added to the recycle stream as required.

Instead of first dissolving the polystyrene beads in hot Bunker "C" oil and then burning, an alternate procedure is to directly dissolve the beads in an oven at a temperature of at least 150°F directly upon the beads' removal from the separation column. The presence of trapped oil in the beads is believed essential to their dissolving at temperatures in the above range since polystyrene beads containing no oil have not shown any degree of dissolving or decomposition even at high temperatures.

Figure 4:
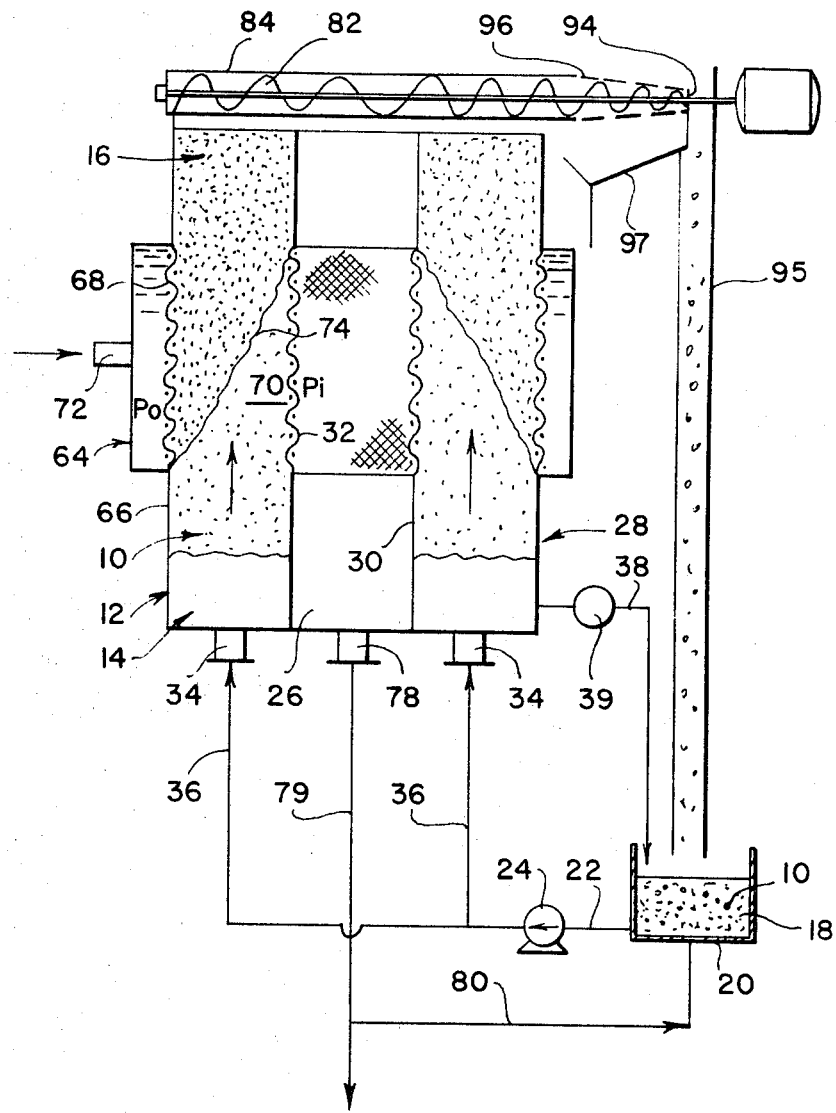
FIG. 4 is a schematic flow diagram showing the continuous separation of an oil-water mixture and the regeneration of contaminated filter material by expressing the oil from the filter material.

In accordance with a preferred embodiment of a post filtration process, the filter material is regenerated by separating the first component from the filter material so that the filter material can be reused and fed back to the separation column. In one method of regenerating the filter material, the filter material is porous, easily compressible material and the first component is extracted by compressing the filter material to express the component from the material. For example, the filter material can be an absorbent material made of polyurethane foam, or a felt stock, such as Dynel fibers. As shown in FIG. 4, the absorbent material, contaminated with oil, is removed from the top of separation column 12 where it enters an auger-type expressor in the form of conveyor 84. Internal screw 82 of conveyor 84 advances the absorbent material from the top of separation column 12 to an outlet 94 where the absorbent material falls into a chute 95 which leads to slurry tank 20.

Conveyor 84 is provided with a tapered screened throat 96 at its front so that as the absorbent material passes from the back of the conveyor towards outlet 94, the absorbent material is gradually compressed by action of internal screw 82. Due to its porous nature, the oil contained within the structure of the absorbent material is forced from the absorbent material and flows through the openings in screened throat 96 to an oil storage 97. The absorbent material as it leaves the conveyor, is thereby cleansed of contaminating oil, so that the material that enters the slurry tank is substantially free from contaminated oil and can be used again in the separation column.

Although expression of oil from compressible absorbent material results in removal of a major portion of the oil from the material, nevertheless, residual oil remains. The filter material thus retains its oleophilic character and can therefore be reused in the separation column. The resilience lifetime of the expressible filter material determines how often the filter material must be replaced and the amount of material that has to be added to maintain the column on a continuous steady state basis. Although the expressing means here shown comprises an auger-type expressor, it will be apparent that other conventional expression means, such as, for example, a set of rollers, can be used to squeeze the oil from the filtering material. Also, the filter material can, if desired, be preheated to aid in expressing the oil from the filter material.

Another embodiment of regenerating the filter material comprises extracting the entrained oil by solvent washing or stripping the oil from the filter material. After the filter material has been contacted by the solvent, it can then be drained of solvent by subjecting the filter material to centrifugal force.

When the absorbent material is contaminated with oil residues, and especially Bunker "C" oil, regular diesel oil is, at present, the preferred solvent extractant, and is particularly suitable aboard ship since almost all ships carry such oil for their emergency diesel generator. When using diesel oil, an amount roughly equal to the amount of Bunker "C" oil contained within the absorbent material is contacted with the absorbent material.

Figure 3:
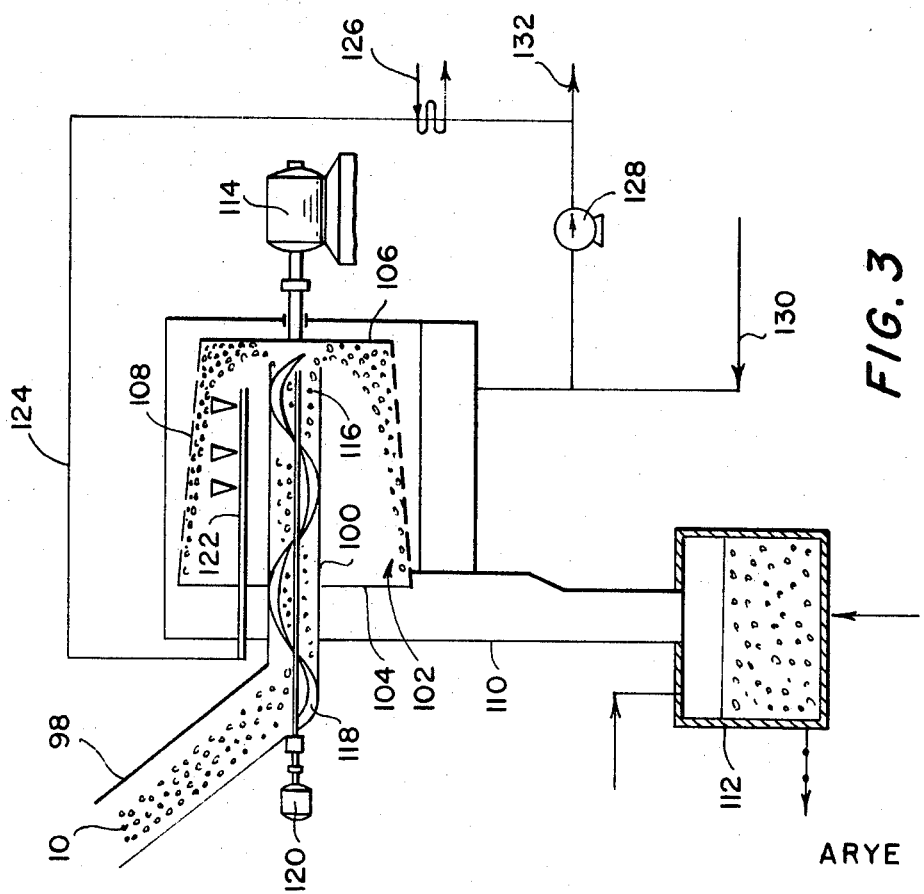
FIG. 3 is a schematic diagram showing one embodiment of a method for regenerating removed filter material for further use by separating the oil from the filter material in a rotating basket.

As here embodied, and as shown in FIG. 3, solvent washing of the filter material is accomplished by spraying a solvent on the surface of moving filter material. As shown in FIG. 3, solid absorbent 10 containing oil droplets is moved by gravity through a chute 98 to a pipe 100 positioned within a rotating basket, generally 102. Basket 102 has an open end 104, a closed end 106, and a perforated side wall 108 which has openings large enough to permit liquid to flow out of the basket but small enough to prevent the particulate filter material from passing through. Open end 104 of the basket is connected to a slurry chute 110 which is connected to a slurry tank 112. A drive means, here illustrated as drive motor 114 rotates basket 102 about its horizontal axis.

Pipe 100 has an open end 116 adjacent closed end 106 of basket 102 and a feeding screw 118, driven by a drive motor 120, is positioned within pipe 100 to feed the filter material from chute 98 out through open end 116 of the pipe and into basket 102. A spray pipe 122 is positioned adjacent side wall 108 to spray solvent against the surface of the filter material. Spray pipe 122 is connected to a solvent line 124 which is heated by a heater 126. Solvent is forced through solvent line 124 and into spray pipe 122 by pump 128. Solvent can be added to solvent line 124 by a solvent inlet line 130 and can be withdrawn from the solvent line by an outlet line 132.

In operation, solid absorbent 10 is fed to rotating basket 102 from the separation column through chute 98 and pipe 100. Basket 102 is rotated by drive motor 114 and as absorbent 10 enters basket 102, the centrifugal force generated by the rotating basket forces the absorbent against side wall 108 of the basket and toward the basket's open end 104. As solid absorbent 10 moves toward open end 104 spray pipe 122 sprays solvent onto its surface to entrain the oil in the solvent and remove the oil from the absorbent material. The centrifugal force generated by rotating basket 102 then forces the solvent from the absorbent material and causes the solvent to flow through the openings in basket side wall 108. The centrifugal force then moves the regenerated solid absorbent past open end 104 and into slurry chute 110 where it falls by gravity to slurry tank 112 for reuse in the separation column.

In another embodiment of stripping the oil from absorbent material 10, the absorbent material can be passed through a solvent column where it is contacted with solvent and then collected at the top of the column. After collection, the absorbent material is then fed to a rotating basket where the solvent is drained from the absorbent material by centrifugal force. This arrangement of solvent extraction is, however, presently considered most useful when the process of this invention is performed on land.

A still further embodiment of a method for regenerating the filter material is to extract contaminated oil from the absorbent material by heating the beads by hot air or steam to increase the fluidity of the oil and force it from the absorbent material. Subsequently, the solid absorbent can be drained of oil, if desired, by applying centrifugal force to the absorbent in a rotating basket before the absorbent is fed back to the separation column.

Yet another method of regenerating the filter material can be used when the absorbent material is ceramic or metallic, and capable of withstanding the combustion temperatures of the oils that have been removed from the fluid stream and deposited on the filter material. In this method the filter material containing the oils is fed to a burner where the oil is burned from the filter material. After the filter material is free of oil, it is then fed to the slurry tank and again used to form the slurry which is sent to the separation column.

It can thus be seen that the operation of the separation column does not depend on differences in the specific gravity of the various components of the fluid stream to obtain separation, and thus suspensions of light oil and/or heave oil can be clarified on a continuous basis. Wide fluctuations in the content of the water to be treated are readily accommodated. The separation column of this invention can be used for clarifying waters containing higher oil content than that usually found in ballast water and is not sensitive to dirty sea water or surges in oil contamination level.

An important and unique feature of the process is that of a steady state formation and continuous deconsolidation of the filter bed, thus insuring a continuous mode of operation even with heavy oils. The bed is continuously replenished with fresh filter material while contaminated or saturated filter material is continuously withdrawn. The continuous operation of this process is advantageous in that it reduces the physical size of the process equipment required to separate an oil and water mixture and thus can be operated either aboard ship or on shore.

The invention in its broader aspects is not limited to the specific details shown and described and departures may be made from such details without departing from the principles of the invention and without sacrificing its chief advantages.

What is claimed is:

1. A process for continuously removing a first component from a fluid stream comprising;
   a. providing a bed of solid filter material in an elongated separation column having a particle inlet end and a particle exit end;
   b. creating and maintaining a hydraulic force acting on the bed in a first direction from the particle inlet end toward the particle exit end to consolidate the filter material and continuously move it through the column in the first direction from the particle inlet end toward the particle exit end by flowing a carrier liquid through the filter material in the first direction and withdrawing it at a point intermediate the ends of the column;
   c. introducing a fluid stream into the column and contacting the stream with the solid filter material to remove a first component of the stream; and
   d. separately removing the filter material containing the first component of the fluid stream and the fluid stream from the column.

2. The process of claim 1 wherein the first component is a solid.

3. The process of claim 1 wherein the first component is a liquid.

4. The process of claim 1 wherein the first component is a gas.

5. The process of claim 1 wherein the removal of the first component by the filter material is accomplished by ion exchange.

6. The process of claim 1 wherein the fluid stream is introduced and contacted with the solid filter material at a point intermediate the particle inlet and exit ends of the column.

7. The process of claim 1 wherein the removed filter material is regenerated by separating the first component from the filter material.

8. The process of claim 7 wherein the regenerated filter material is fed into the separation column.

9. The process of claim 8 wherein the first component is a liquid and is separated from the filter material by heating the removed filter material to increase the fluidity of the liquid.

10. The process of claim 9 including applying centrifugal force to the filter material to aid in removing the liquid from the filter material.

11. The process of claim 8 wherein the first component is a liquid and is separated by contacting the filter material with a solvent for the liquid.

12. The process of claim 11 including applying centrifugal force to the filter material to aid in removing the liquid from the filter material.

13. The process of claim 12 wherein the first component contains Bunker "C" oil and the solvent is diesel oil.

14. The process of claim 1 wherein the removed filter material is a dissolvable plastic and the removed filter material is dissolved in a solvent.

15. The process of claim 1 wherein the fluid stream is an oil-water, liquid-liquid mixture, and the filter material is an absorbent material capable of removing oil from the mixture.

16. The process of claim 15 wherein the oil includes Bunker "C" oil.

17. The process of claim 1 wherein the fluid stream is passed transversely through the moving filter material.

18. An apparatus for continuously removing a first component from a fluid stream comprising:
   a. an elongated separation column having a particle inlet end for admitting solid filter material and a particle exit end for removing solid filter material;

b. a bed of solid filter material positioned within the separation column between the ends of the column;

c. an inlet opening for introducing a fluid stream into the separation column and contacting the fluid stream with the solid filter material;

d. means for creating and maintaining a hydraulic force acting on the bed in a first direction from the particle inlet end toward the particle exit end to consolidate the filter material and continuously move it through the column in the first direction from the particle inlet end toward the particle exit end by flowing a carrier liquid through the filter material in the first direction and withdrawing it at a point intermediate the ends of the column; and e. an outlet opening intermediate the particle inlet and exit ends for removing an exiting fluid flow from the filter material.

19. The apparatus of claim 18 including means for regenerating the removed filter material by separating the first component from the filter material.

20. The apparatus of claim 19 including means for contacting the filter material with a solvent for removing the first component from the filter material.

21. The apparatus of claim 19 including means to apply centrifugal force to the filter material to aid in removing the first component from the filter material.

22. The apparatus of claim 18 wherein the inlet opening and outlet opening are laterally aligned for permitting the fluid stream to flow laterally through the separation column.

23. The apparatus of claim 18 including control means to vary the flow rate of the carrier liquid to control the hydraulic force produced in the column.

24. An apparatus for continuously removing a first component of a fluid stream comprising:

a. an elongated separation column having a core and an exterior shell which surrounds the core, said shell having a particle inlet end for admitting solid filter material and a particle exit end for removing solid filter material;

b. a bed of solid filter material positioned within the shell between the particle inlet and exit ends;

c. an inlet opening for introducing a fluid stream into said shell and contacting the fluid stream with the solid filter material;

d. means for creating and maintaining a hydraulic force acting on the bed in a first direction from the particle inlet end toward the particle exit end to consolidate the filter material and continuously move it through the column in the first direction from the particle inlet end toward the particle exit end by flowing a carrier liquid through the filter material in the first direction and withdrawing it at a point intermediate the ends of the column; and e. an outlet opening intermediate the particle inlet end and exit end for permitting an exiting fluid flow to be removed from the filter material and into said core.

25. A process for continuously moving a first component from a fluid stream comprising:

a. providing a bed of solid filter material is an elongated separation column having a particle inlet end and a particle exit end;

b. introducing fresh filter material to the particle inlet end of the column;

c. creating and maintaining a hydraulic force acting on the bed in a first direction from the particle inlet end toward the particle exit end to consolidate the filter material and continuously move it through the column in the first direction by flowing a first liquid stream through the filter material in the first direction and withdrawing it at a point intermediate the ends of the column;

d. introducing a fluid stream into the column and contacting it with the solid filter material to remove a first component of the fluid stream; and e. separately removing the filter material containing the first component of the fluid stream and the fluid stream from the column.

26. The process of claim 25 wherein the first liquid stream is a carrier liquid that introduces the fresh filter material to the particle inlet end of the column.

27. An apparatus for continuously removing a first component from a fluid stream comprising:

a. an elongated separation column having a particle inlet end for admitting solid filter material and a particle exit end for removing solid filter material;

b. a bed of solid filter material positioned within the separation column between the ends of the column;

c. an inlet opening for introducing a fluid stream into the separation column and contacting the fluid stream with the solid filter material;

d. means for introducing fresh filter material to the particle inlet end of the column;

e. means for creating and maintaining a hydraulic force acting on the bed in a first direction from the particle inlet end toward the particle exit end to consolidate the filter material and continuously move it through the column in the first direction by flowing a first liquid stream through the filter material in the first direction and withdrawing it at a point intermediate the ends of the column; and f. an outlet opening intermediate the ends of the column for removing an exiting fluid from the filter material.

28. An apparatus for continuously removing a first component of a fluid stream comprising:

a. an elongated separation column having a core and an exterior shell which surrounds the core, said shell having a particle inlet end for admitting solid filter material and a particle exit end for removing solid filter material;

b. a bed of solid filter material positioned within the shell between the particle inlet and exit ends;

c. an inlet opening for introducing a fluid stream into said shell and contacting the fluid stream with the solid filter material;

d. means for introducing fresh filter material to the particle inlet end of the column;

e. means for creating and maintaining a hydraulic force acting on the bed in a first direction from the particle inlet end toward the particle exit end to consolidate the filter material and continuously move it through the column in the first direction by flowing a first liquid stream through the filter material in the first direction and withdrawing it at a point intermediate the ends of the column; and f. an outlet opening intermediate the particle inlet end and exit end for permitting an exiting fluid flow to be removed from the filter material and into said core.

* * * * *